United States Patent [19]
Raap et al.

[11] 3,756,440
[45] Sept. 4, 1973

[54] DEVICE FOR ATTACHING LOADING RAMP TO PICKUP TRUCK TAILGATE

[76] Inventors: Gerald G. Raap, Rt. 4, Crestwood Hill; Donald F. Kutz, Rt. 1, S. Lake Darling, both of Alexandria, Minn. 56308

[22] Filed: Apr. 25, 1972

[21] Appl. No.: 247,412

[52] U.S. Cl. .................................. 214/85, 296/61
[51] Int. Cl. ............................................. B65g 67/02
[58] Field of Search ........................... 214/85, 85.1; 296/61; 14/71, 72

[56] References Cited
UNITED STATES PATENTS
3,352,440  11/1967  Wilson .................................. 214/85
3,642,156  2/1972  Stenson ................................. 214/85

Primary Examiner—Albert J. Makay
Attorney—Harvey B. Jacobson et al.

[57] ABSTRACT

A mounting assembly for use in supporting a loading ramp from truck tailgate in an operative rearwardly and downwardly inclined position when the tailgate is in an open position and for swinging of the tailgate to a stored position overlying the inner surface of and supported from the tailgate when the latter is in its raised closed position.

10 Claims, 7 Drawing Figures

PATENTED SEP 4 1973 3,756,440

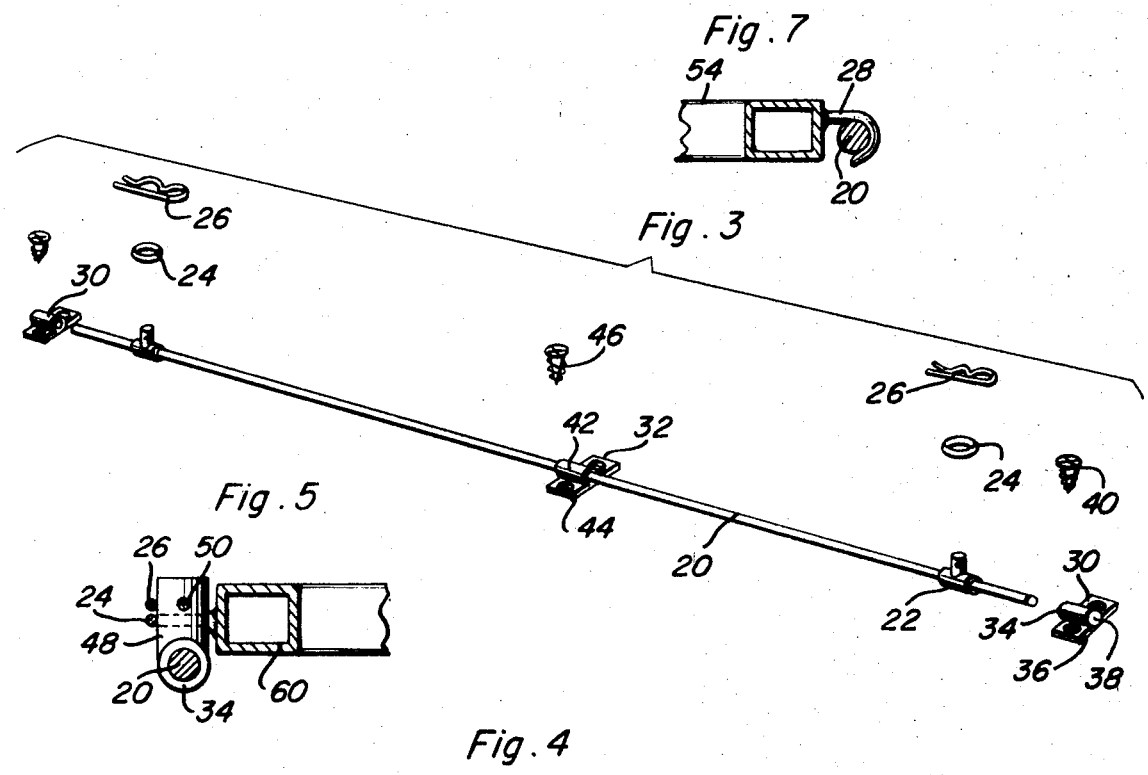
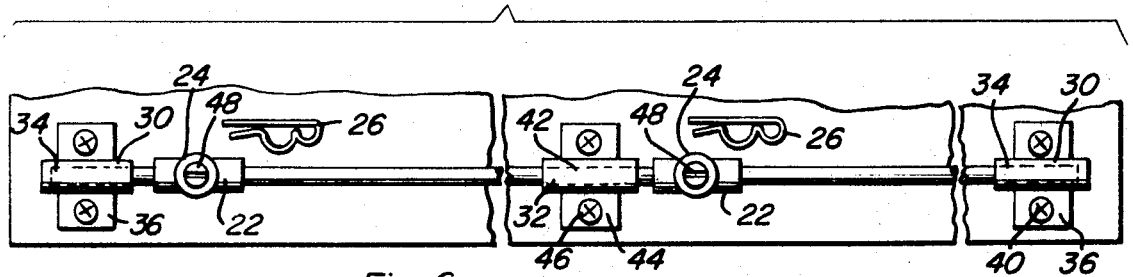
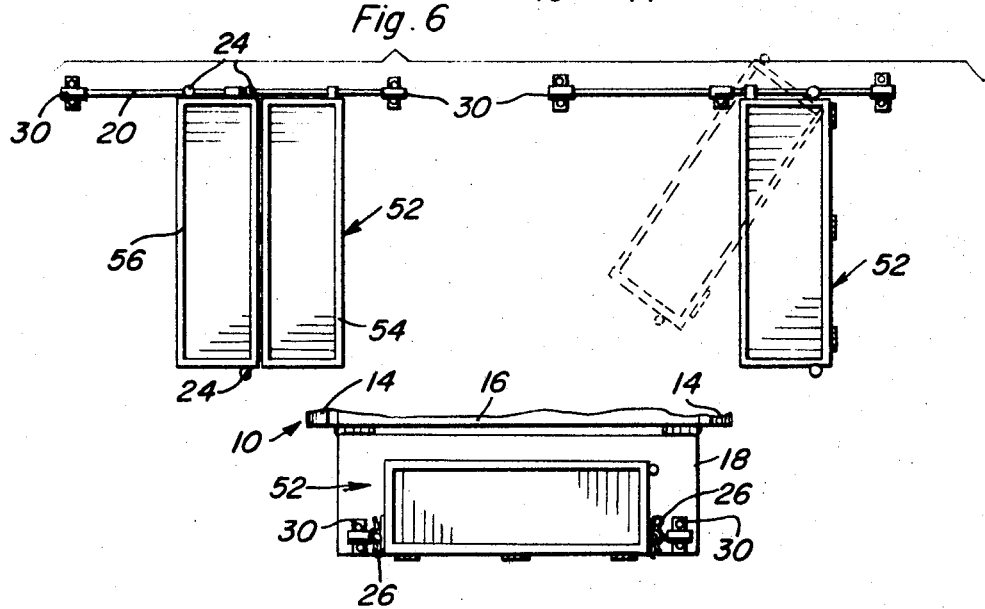

DEVICE FOR ATTACHING LOADING RAMP TO PICKUP TRUCK TAILGATE

The mounting assembly of the instant invention consists primarily of an assemblage of hardware so related to and supported from a loading ramp and an associated tailgate whereby the ramp may be quickly swung from an operative position extending rearwardly and downwardly from an open tailgate to a stored position supported from the inner surface of the tailgate when the latter is in the closed position. The mounting assembly has been designed to enable this manner of mounting of a loading ramp to a tailgate by the utilization of simple tools and with little effort. In addition, many of the hardware pieces of the mounting assembly are presently commercially available and the hardware need not be modified when used in conjunction with different loading ramps or tailgates.

The main object of this invention is to provide a mounting structure or assembly whereby a loading ramp may be supported from a tailgate so that it may be readily shifted from an operative rearwardly and downwardly inclined position when the tailgate is in the open position to a stored position overlying and supported from the inner surface of the tailgate when the latter is in its closed position.

Another object of this invention, in accordance with the immediately preceding object, is to provide a tailgate mounting assembly that will enable the associated ramp and tailgate to be quickly shifted from their open and operative positions, respectively, to their closed and stored positions, respectively.

A still further object of this invention is to provide a loading ramp structure supported from an associated tailgate in a manner such that the loading ramp may be readily shifted from its operative position to its stored position with little effort.

A final object of this invention to be specifically enumerated herein is to provide a mounting assembly in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 3 is an exploded perspective view of the hardware portions of the mounting assembly to be supported from the tailgate;

FIG. 4 is a fragmentary enlarged top plan view of the rear marginal portion of the tailgate with the tailgate mounting assembly supported therefrom and also two of the anchor eye members to be carried by the associated loading ramp engaged with the anchor pin portions of the two slides carried by the tailgate;

FIG. 5 is an enlarged fragmentary sectional view illustrating the manner in which one of the anchor eye members carried by the loading ramp is removably pivotally secured to the corresponding anchor pin portion of the tailgate mounted hardware;

Figure 1:
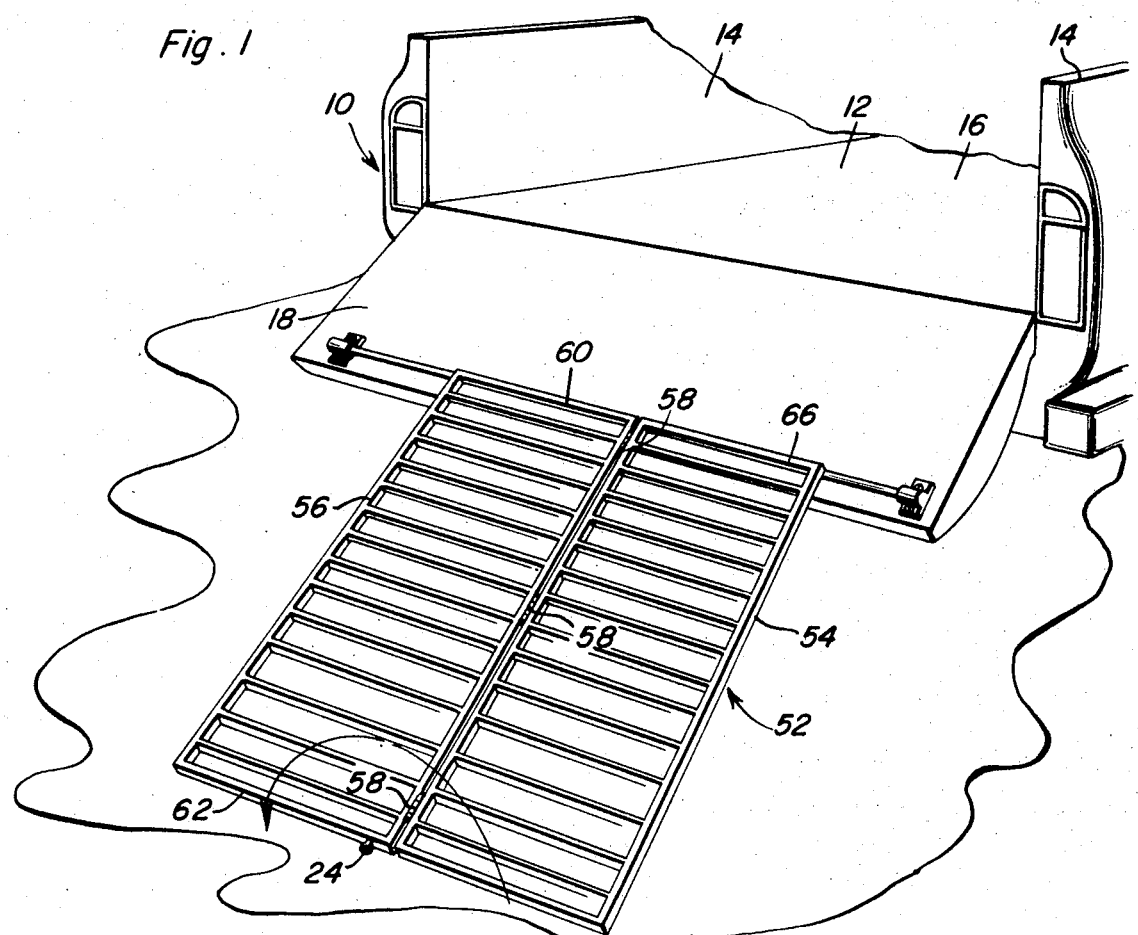
FIG. 1 is a fragmentary perspective view of the rear end of a conventional form of pickup truck equipped with a tailgate and with a loading ramp supported from the tailgate by the mounting assembly of the instant invention.

FIG. 6 is a grouping of three plan views of the mounting assembly and the associated loading ramp illustrating the manner in which the loading ramp is associated with the mounting assembly when in the operative position, folded and then swung toward the stored position and thereafter secured in the stored position; and FIG. 7 is an enlarged fragmentary vertical sectional view illustrating the manner in which the foldable section of the loading ramp is supported from the mounting assembly when the loading ramp is in the operative position.

Referring now more specifically to the drawings, the numeral 10 generally designates a conventional form of vehicle such as a pickup truck including a load bed 12 having opposite side walls 14 interconnected by means of a bottom wall 16. The load bed 12 further includes a tailgate 18 hingedly supported from the rear marginal portion of the bottom wall 16 in any convenient manner (not shown) and swingable between the rearwardly and downwardly inclined open position illustrated in FIG. 1 of the drawings and a closed upstanding position extending between the rear ends of the side walls 14. Of course, the foregoing comprises a description of a conventional form of pickup truck load bed.

The mounting assembly of the instant invention consists of an elongated guide member 20, a pair of followers 22, a plurality of anchor eyes 24, a pair of spring-type safety pins 26, an anchor hook 28 and a pair of opposite end mounting fixture 30 and a central mounting fixture 32 for mounting the guide member 20 on the tailgate 18.

The guide member 20 comprises a cylindrical rod and the fixtures 30 comprise sleeve members 34 with apertured mounting flanges 36 supported therefrom. The sleeve members 34 are aligned and closed at their opposite ends by means of end walls 38. The fixtures 30 are secured to the opposite ends of the free swinging edge of the tailgate 18 by means of fasteners 40 secured through the mounting flanges 36 and the opposite ends of the rod 20 are held captive within the sleeve members 34. In addition, the center mounting fixture 30 also comprises a sleeve member 42 including an apertured mounting flange 44 and the mounting fixture 32 is secured to the central portion of the free swinging edge of the tailgate 18 by means of a fastener 46, the opposite ends of the sleeve member 42 being open and the central portion of the guide member or rod 20 passing through the sleeve member 42.

Each of the followers or slides 22 includes an outstanding anchor pin portion 48 provided with a diametric bore 50 through which the straight leg of one of the safety pins is receivable.

Figure 2:
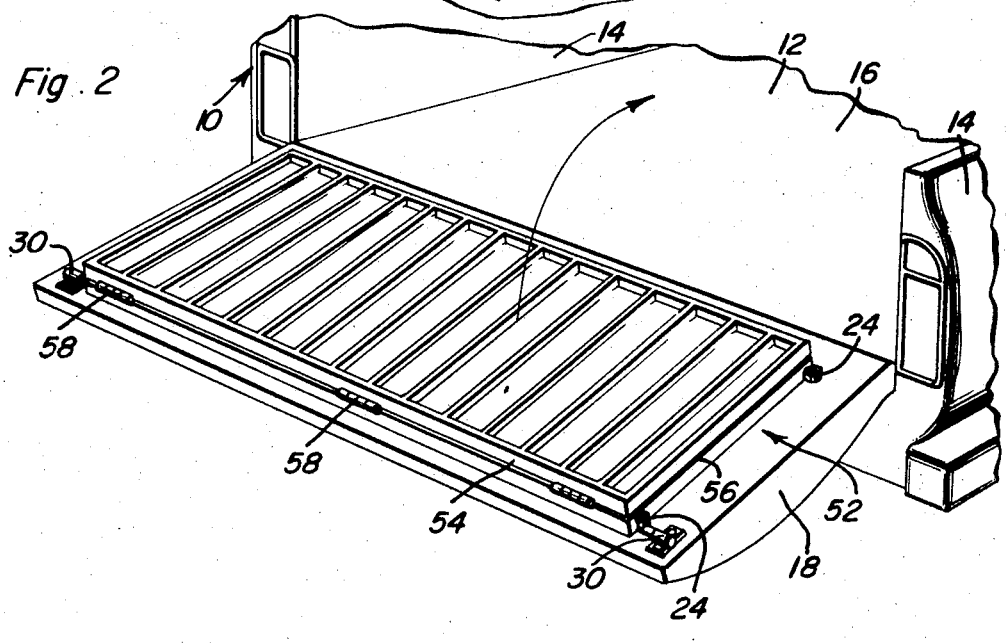
FIG. 2 is a fragmentary perspective view similar to FIG. 1 but with the loading ramp swung to its stored position.

A loading ramp is referred to in general by the reference numeral 52 and includes a pair of side-by-side ramp sections 54 and 56 joined together by means of a plurality of hinges 58 for swinging between the coplanar positions thereof illustrated in FIG. 1 of the drawings and parallel side-by-side positions such as that illustrated in FIG. 2 of the drawings.

The section 56 includes a first end member 60 to whose opposite ends a pair of the anchor eyes 24 are secured by welding. In addition, the section 56 includes a second end member 62 to whose end adjacent the section 54 a third anchor eye 24 is secured by welding. Finally, the hook member 28 is welded to the end member 66 corresponding to the end member 60 at the end thereof remote from the section 56.

It will be noted from FIG. 4 of the drawings that one of the followers or slides 22 is disposed between the sleeve member 42 and one of the sleeve members 34 while the other follower 22 is disposed between the other follower 22 and the sleeve member 42. With the loading ramp 52 in its unfolded operative position when the tailgate 18 is disposed in a rearwardly and downwardly inclined position such as that illustrated in FIG. 1 of the drawings, the anchor eyes 24 carried by the tailgate end of the loading ramp 52 are engaged over the anchor pin portions 48 and retained in position thereon by means of the removable safety pins. Of course, it will be appreciated that the followers 22 are rotatably disposed on the rod or guide member 20 and also that the anchor eyes 24 are rotatably engaged with the anchor pin portions 48. In addition, when the loading ramp 52 is in the operative position, the hook member 28 is engaged over the right hand end of the guide member or rod 20.

It may of course be seen from FIG. 1 of the drawings that when the ramp 52 and tailgate 18 are in the rearwardly and downwardly inclined position loads may be readily moved upwardly along the ramp 52, up the tailgate 18 and onto the bottom wall 16 of the load bed 12. After the load bed 12 has been loaded, the ramp 52 may have the right section 54 thereof swung upwardly and over on top of the left hand section 56. Then, the pin 26 at the left hand margin of the section 56 is removed from the associated anchor pin portion 48 and the folded ramp assembly 52 is slid to the right until the right hand follower 22 is adjacent the right hand fixture 30 and the folded ramp 52 is then swung in a clockwise direction in the manner illustrated in phantom lines in FIG. 6 of the drawings until the folded ramp 52 overlies the tailgate 18. Then, the previously removed pin 26 is again engaged with the corresponding anchor pin portion 48 after the anchor eye 24 at the free swinging end of the folded loading ramp 52 is slipped over that anchor pin portion. In this manner, the folded loading ramp 52 is secured in position overlying the upper surface of the tailgate 18 so that when the latter is swung to the closed position the folded and stored loading ramp 52 will overlie and be supported from the inner surface of the closed tailgate 18.

It will of course be appreciated that if a wide loading ramp is not required the section 54 may be omitted together with the hook member 28 supported therefrom. Further, the sections 54 and 56 of the loading ramp 52 may be of any conventional design and constructed of corrosion resistant materials.

It will be further noted that the only attachment of the mounting assembly to the tailgate 18 is by the three fixtures 30 and 32 being secured to the tailgate 18 by means of the fasteners 40 and 46. Thus, the mounting assembly may be readily attached to substantially all types of tailgates in a minimum of time and through the utilization of simple tools.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention.

What is claimed as new is as follows:

1. A mounting assembly for use in supporting a loading ramp from a truck tailgate in an operative position inclined rearwardly and downwardly when the tailgate is in an open position and also in a manner allowing the ramp to be swung to a stored position overlying the inner surface of and supported from the tailgate when the latter is in its raised closed position, said mounting assembly comprising an elongated guide member including means carried by its opposite end portions for securement to the inner surface of a tailgate adjacent the free swinging edge portion thereof, a pair of followers slidingly disposed on said guide member for movement therealong and also supported from said guide member for rotation thereabout, a pair of anchor members for support from opposite side portions of one end of a loading ramp, one of said anchor members being oscillatably supported from one of said followers for angular displacement relative thereto about an axis disposed generally normal to said guide member, the other anchor member being readily removably secured to the other follower, a third anchor member for securement to the side portion of the other end of said loading ramp corresponding to the side portion thereof from which said other anchor member is to be secured, said third anchor member being readily removably securable to said other follower.

2. The combination of claim 1 wherein said elongated guide member comprises a cylindrical member, said followers each including sleeve portions slidably and rotatably mounted on said guide member.

3. The combination of claim 2 wherein each of said sleeve members includes an integral pivot pin portion projecting outwardly therefrom at generally right angles relative thereto, said anchor members each comprising an eye member rotatably and telescopically receivable over the corresponding pivot pin portion.

4. The combination of claim 3 including retaining means readily removably engageable with each of said pivot pin portions outwardly of the corresponding eye member for releasably securing said eye members on said pivot pin portions.

5. The combination of claim 1 wherein said means carried by the opposite end portions of said guide member define opposing sockets in which the opposite ends of said guide member are captively retained.

6. The combination of claim 1 wherein said assembly further includes an abutment member for securement to a hinged lateral extension of said loading ramp and to be carried by the end of the free swinging edge portion of the ramp extension for abutting engagement with said guide member.

7. In combination with a vertically swingable vehicle tailgate, an elongated ramp structure, an elongated guide member supported from and extending along the free swinging edge of said tailgate, a pair of followers slidably and oscillatably mounted on said guide member for movement therealong and angular displacement about axes generally paralleling said guide member, said ramp including opposite end and opposite side marginal portions, the opposite ends of one of said end marginal portions including first and second attaching means readily releasably attached to said followers, said first attaching means and the corresponding follower including coacting means attaching the first attaching means to the corresponding follower for angular displacement of the ramp relative to the follower about an axis disposed generally normal to said axes, and third attaching means carried by the other end of said ramp at the side thereof from which the first attaching means is supported readily releasably attachable to the follower to which the first attaching means if attached.

8. The combination of claim 7 wherein said side of said ramp from which the first and third attaching means are supported includes a pivoted extension secured thereto for swinging movement between an extended substantially coplanar position projecting outwardly of the corresponding side of the ramp and a folded inoperative position folded over and superimposed on said ramp, the end of the free swinging edge portion of said extension corresponding to the end of said ramp from which said first and second attaching means are secured including an abutment overlyingly engageable with said elongated guide member when said first and second attaching means are attached to said followers.

9. The combination of claim 7 wherein said elongated guide member comprises a cylindrical member, each of said followers including a sleeve rotatably and slidably disposed on said cylindrical member.

10. The combination of claim 9 wherein each of said sleeves includes a laterally outwardly projecting pivot pin portion, said attaching means each including an eye portion rotatably and slidably receivable over the corresponding pivot pin portion.

\* \* \* \* \*